United States Patent
Yamamoto (10) Patent No.: US 7,453,237 B2
(45) Date of Patent: Nov. 18, 2008

(54) BATTERY PACK

(75) Inventor: Hiroyoshi Yamamoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 433 days.

(21) Appl. No.: 11/270,469

(22) Filed: Nov. 10, 2005

(65) Prior Publication Data

US 2006/0103349 A1     May 18, 2006

(30) Foreign Application Priority Data

Nov. 12, 2004   (JP)   ............ 2004-328962

(51) Int. Cl.
*H02J 7/00*   (2006.01)
(52) U.S. Cl. .................... 320/118; 320/116
(58) Field of Classification Search ............ 320/112, 320/116, 118, 128, 135, 136
See application file for complete search history.

(56) References Cited

U.S. PATENT DOCUMENTS 5,498,950 A    3/1996   Ouwerkerk

2003/0062874 A1 *  4/2003  Furukawa ............ 320/121

FOREIGN PATENT DOCUMENTS

| EP | 0 512 340 | 11/1992 |
|----|-----------|---------|
| JP | 11-233154 | 8/1999 |
| JP | 2004-129439 | 4/2004 |

* cited by examiner

*Primary Examiner*—Akm E Ullah
*Assistant Examiner*—Ramy Ramadan
(74) *Attorney, Agent, or Firm*—Wenderoth, Lind & Ponack, L.L.P.

(57) ABSTRACT

A battery pack that detects the voltage of a plurality of batteries (1) connected in series with a plurality of voltage detection circuits (2). When a voltage detection circuit output is HIGH, batteries (1) discharge through an output resistor (6). In addition, discharge circuits (7), which are series connections of balance resistors (8) and switching devices (9), are connected in parallel with batteries (1) left "un-discharged" by the output resistors (6). When a voltage detection circuit output is HIGH, some batteries (1) are discharged by the output resistor (6) and the "un-discharged" batteries (1) are discharged by the discharge circuit (7). When a voltage detection circuit output is LOW, no batteries (1) are discharged by the output resistor (6) and the "un-discharged" batteries (1) are also left un-discharged by the discharge circuit (7) to balance the discharge currents of all the batteries (1).

14 Claims, 7 Drawing Sheets

BATTERY PACK

BACKGROUND OF THE INVENTION

This invention relates to a battery pack provided with a voltage detection circuit to detect battery voltage, and in particular to a battery pack that detects the voltage of a plurality of batteries with a plurality of voltage detection circuits.

In a battery pack housing a plurality of batteries, detecting the voltage of each battery and controlling charging and discharging can reduce battery degradation. This is because over-charging and over-discharging can be prevented for all batteries by suspending battery pack discharging if any battery becomes fully discharged and its voltage drops to a minimum voltage, and by suspending battery pack charging if any battery becomes fully charged and its voltage rises to a maximum voltage. Battery voltage for all batteries of the battery pack is detected by either a single voltage detection circuit or a plurality of voltage detection circuits. A battery pack, which detects battery voltage of all batteries with a single voltage detection circuit, detects the voltage of many batteries with that single voltage detection circuit. Therefore, not only does the voltage detection circuitry become complex, but it is necessary to use a specially designed voltage detection circuit. A battery pack, which detects battery voltage with a plurality of voltage detection circuits, can detect voltage for all batteries using standard voltage detection circuits designed to detect the voltage of specific channels.

Figure 1:
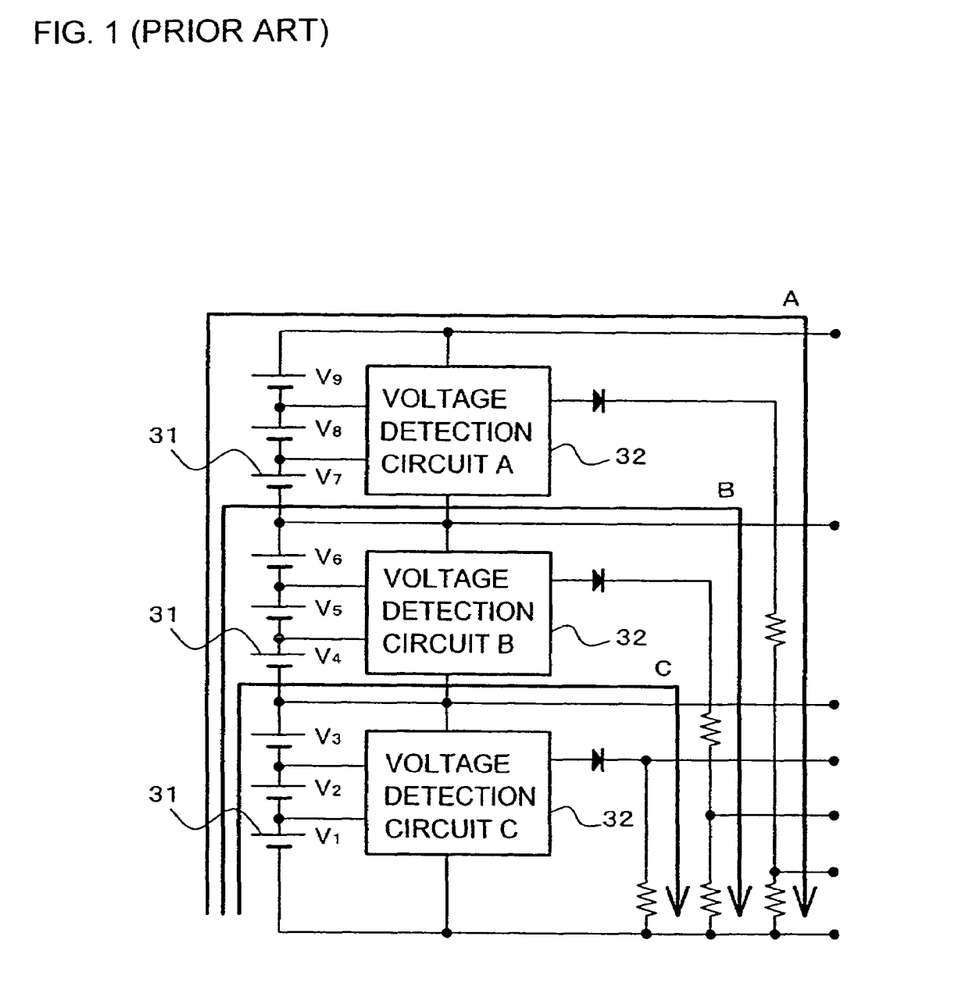
FIG. 1 is a circuit diagram showing one example of a prior art battery pack.

A battery pack has been developed that detects the voltage of a plurality of batteries with a plurality of voltage detection circuits. A block diagram of this battery pack is shown in FIG. 1. This battery pack has the drawback that the voltage detection circuits 32 draw unbalanced discharge currents from the batteries 31. This is because, although equal discharge currents flow to ground from all batteries 31 via the output terminal of the upper most voltage detection circuit 32 as shown by arrow A of FIG. 1, discharge currents from only some of the batteries 31 flow from the middle and lower voltage detection circuits 32 as shown by arrows B and C. Current that flows from the output of a voltage detection circuit is a small current. However, since that current flows continuously, it results in unbalanced battery discharge.

A battery pack, which balances currents by connecting balance resistors in parallel with the batteries, has been developed to prevent this drawback (Japanese Patent Application Disclosure HEI 11-233154 (1999))

Figure 2:
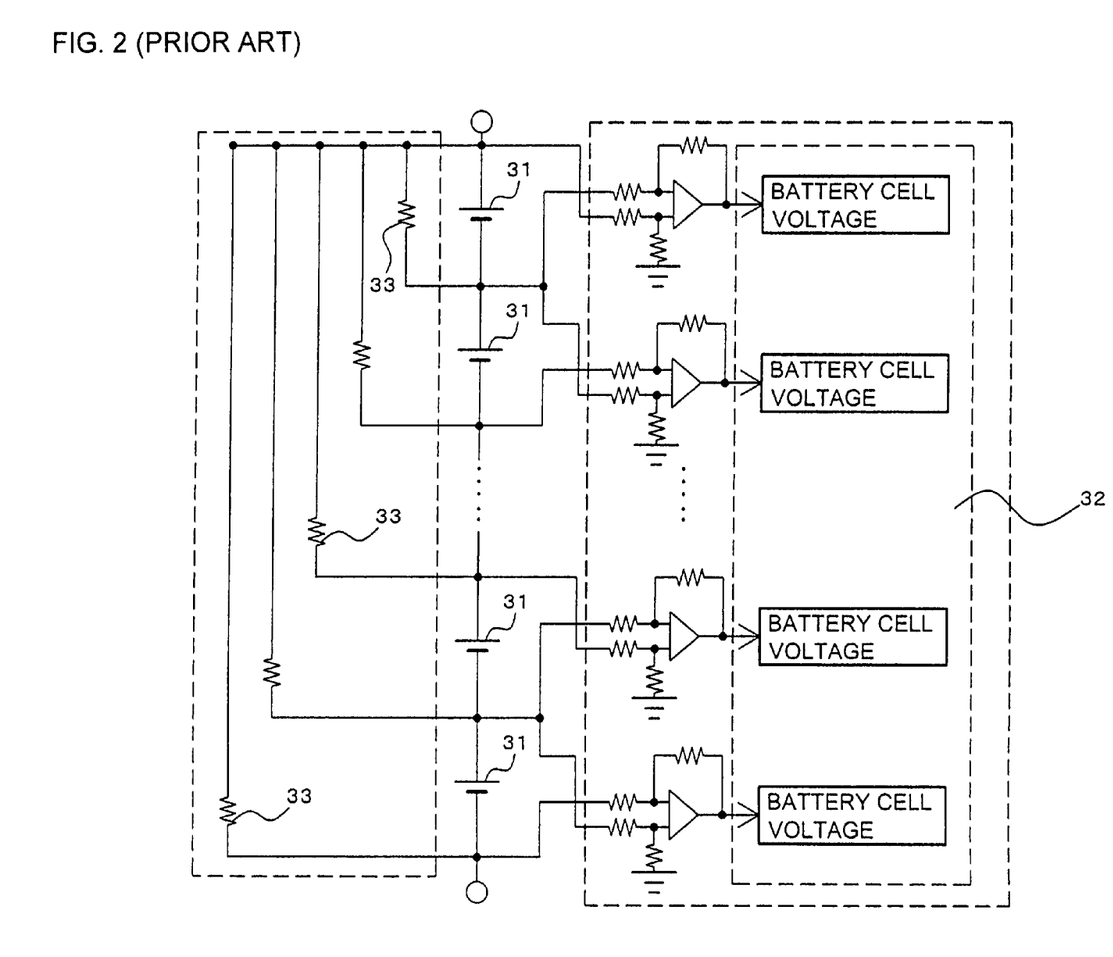
FIG. 2 is a circuit diagram showing another example of a prior art battery pack.

As shown in the circuit diagram of FIG. 2, the battery pack cited in the prior disclosure has expended current adjust resistors 33 connected in parallel with specific batteries 31. The expended current adjust resistors 33 are connected to balance current flow through the paths shown by arrows B and C of FIG. 1. Specifically referring to FIG. 1, the expended current adjust resistors 33 are connected to supplement batteries V1-V3 with the same current that flows in the path of arrow C, and likewise to supplement batteries V1-V6 with the same current that flows in the path of arrow B. Consequently, the expended current adjust resistors 33 balance the unbalanced currents drawn from the batteries 31 by the voltage detection circuits 32.

However, if the output current of a voltage detection circuit changes, current flow through the batteries in this type of battery pack becomes unbalanced. The function of a voltage detection circuit is to compare battery voltage with a set voltage, and depending on whether battery terminal voltage is above or below the set voltage, switch the output to a HIGH or LOW voltage. A battery pack that switches a battery output switch on or off depending on a HIGH or LOW signal issued from a voltage detection circuit cannot always discharge all batteries in a balanced fashion. For example, if expended current adjust resistors are set to balance battery currents when voltage detection circuit output is in a HIGH state, battery currents cannot be balanced when voltage detection circuit output switches to the LOW state.

The present invention was developed with the object of further resolving the drawbacks described above. Thus it is a primary object of the present invention to provide a battery pack that can prevent unbalanced battery discharge, and can discharge all batteries in a balanced fashion at all times while detecting the voltage of a plurality of batteries via a plurality of voltage detection circuits.

SUMMARY OF THE INVENTION

The battery pack of the present invention is provided with a plurality of batteries 1 connected in series, a plurality of voltage detection circuits 2 to detect the voltage of each battery 1, and output switches 3 that are controlled on or off by the output voltage from each voltage detection circuit 2. The output terminals 2a of the plurality of voltage detection circuits 2 are connected to ground via output resistors 6, which connect in series with the voltage detection circuits 2 that output HIGH or LOW signals depending on battery voltage. When the voltage at an output terminal 2a of voltage detection circuit 2 is HIGH, the associated output resistor 6 discharges batteries 1 connected to that voltage detection circuit 2. Further, a discharge circuit 7, which is a series connection of a balance resistor 8 and a switching device 9, is connected in parallel with batteries that remain un-discharged by the output resistor 6 of each voltage detection circuit 2. In this battery pack, when the output voltage of a voltage detection circuit 2 is HIGH, batteries connected to that voltage detection circuit 2 are discharged. Further, the switching device 9 of the discharge circuit 7, which is connected in parallel with the "un-discharged" batteries for that voltage detection circuit 2, is turned on to discharge those "un-discharged" batteries through the balance resistor 8. When the output voltage of a voltage detection circuit 2 is LOW and batteries connected to that voltage detection circuit 2 are not discharged, the switching device 9 of the discharge circuit 7, which is connected in parallel with the other "un-discharged" batteries for that voltage detection circuit 2, is turned off and no other batteries are discharged through the balance resistor 8. This balances the discharge currents of all the batteries.

The battery pack described above has the characteristic that when voltage detection signals are transmitted while the voltage of a plurality of batteries is detected via a plurality of voltage detection circuits, battery capacity unbalance can be prevented and all batteries can be discharged in a fashion that prevents unbalanced discharge. This is because when the output of a voltage detection circuit becomes HIGH and discharge current flows through a voltage detection circuit output resistor, the switching device of a discharge circuit turns on to discharge "un-discharged" batteries through a balance resistor. In particular, the battery pack described above has the characteristic that when a voltage detection circuit outputs a LOW signal and there is no battery discharge via an output resistor, the discharge circuit is controlled so as not to discharge any batteries. Therefore, all batteries can be discharged in a balanced fashion in all cases. A battery pack that discharges all batteries in a balanced fashion does not rapidly degrade any particular battery, solves the problem of shortened battery lifetime, and allows long battery lifetimes.

In the second aspect of the battery pack of the present invention, an AND circuit 13, which is a series connection of switching devices, is connected to the output side of the voltage detection circuits 2. Each voltage detection circuit 2 outputs a HIGH signal to the AND circuit 13 if the voltage of all the batteries 1 being detected is at an allowable discharge voltage, and outputs a LOW signal if the voltage of any battery 1 is below the allowable discharge voltage. If signals input from all the voltage detection circuits 2 are HIGH, the AND circuit 13 turns on the output switch 3 to allow battery pack discharge. If the signal from any voltage detection circuit 2 is LOW, the AND circuit 13 turns off the output switch 3 to cut-off battery pack discharge current. In addition, the switching devices 9 of the discharge circuits 7 are turned off or on by voltage detection circuit output signals. If the output of a voltage detection circuit 2 is HIGH, the associated switching device 9 is turned on, and the balance resistor 8 discharges batteries not directly discharged by that voltage detection circuit 2 and associated output resistor 6.

In the third aspect of the battery pack of the present invention, an OR circuit 15, which is a parallel connection of switching devices, is connected to the output side of the voltage detection circuits 2. Each voltage detection circuit 2 outputs a LOW signal to the OR circuit 15 if the voltage of all the batteries 1 being detected is at an allowable charging voltage, and outputs a HIGH signal if the voltage of any battery 1 is above the allowable charging voltage. If signals input from all the voltage detection circuits 2 are LOW, the OR circuit 15 turns on the output switch 3 to allow battery pack charging. If the signal from any voltage detection circuit 2 is HIGH, the OR circuit 15 turns off the output switch 3 to cut-off battery pack charging current. In addition, the switching devices 9 of the discharge circuits 7 are turned off or on by voltage detection circuit output signals. If the output of a voltage detection circuit 2 is HIGH, the associated switching device 9 is turned on, and the balance resistor 8 discharges batteries not directly discharged by that voltage detection circuit 2 and associated output resistor 6.

The above and further objects and features of the invention will more fully be apparent from the following detailed description with accompanying drawings.

DETAILED DESCRIPTION OF THE PREFERRED EMBODIMENTS

Figure 3:
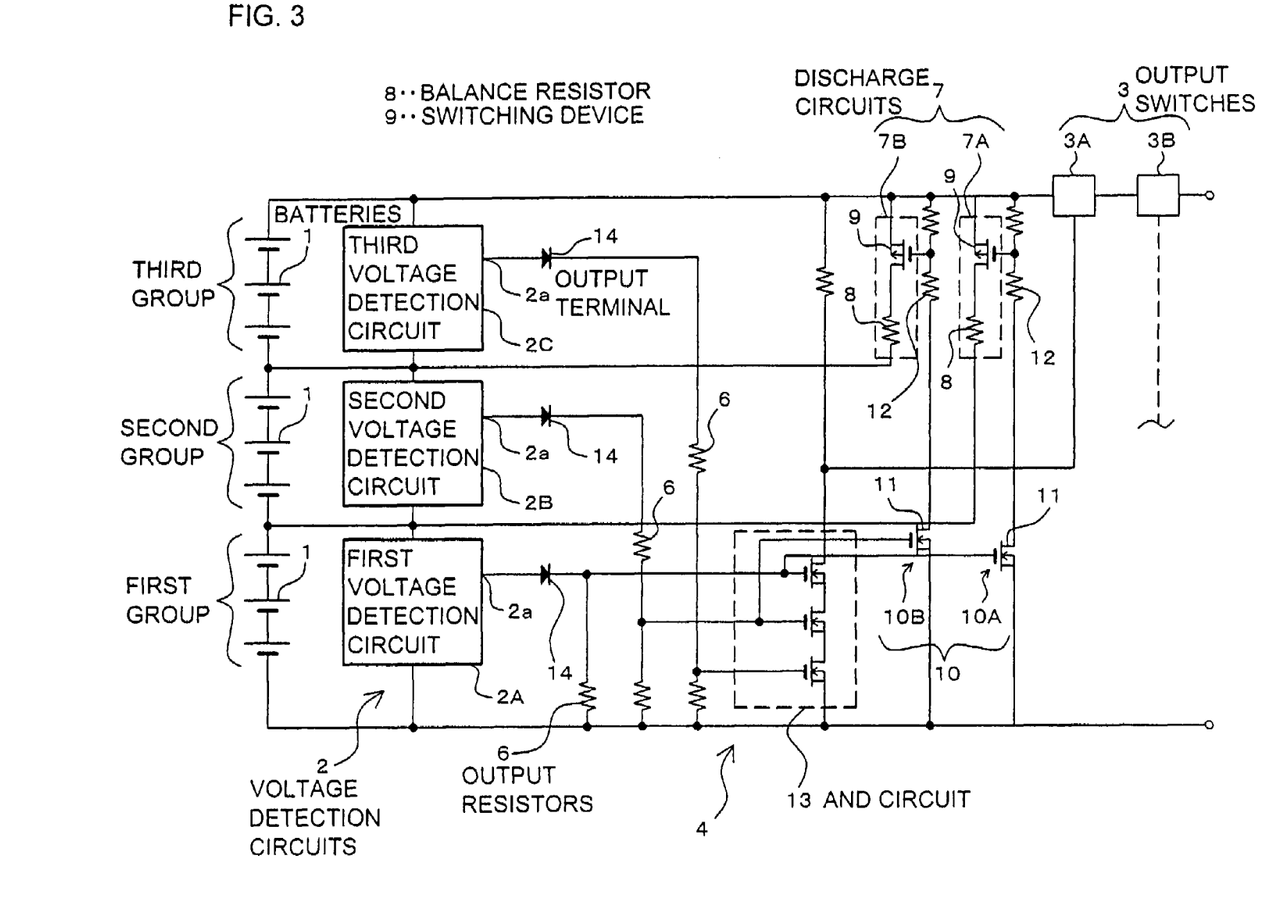
FIG. 3 is a circuit diagram showing the over-discharge protection circuit of a battery pack for an embodiment of the present invention.
Figure 4:
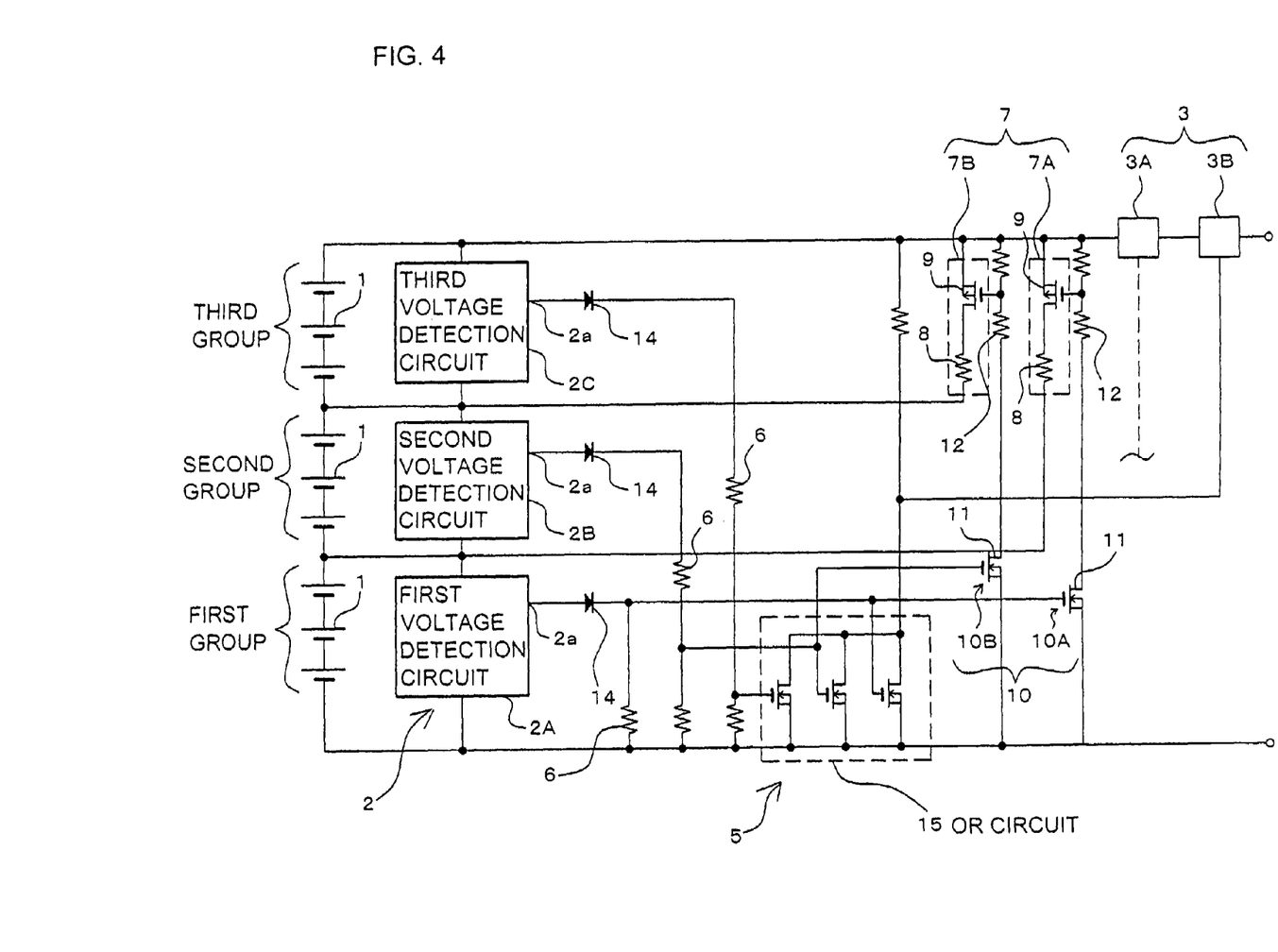
FIG. 4 is a circuit diagram showing the over-charge protection circuit of a battery pack for an embodiment of the present invention.

The battery packs shown in the circuit diagrams of FIGS. 3 and 4 are provided with a plurality of batteries 1 connected in series, a plurality of voltage detection circuits 2 to detect the voltage of each battery 1, and output switches 3 that are controlled on or off by the output voltage from each voltage detection circuit 2. FIG. 3 shows a battery pack provided with an over-discharge protection circuit 4 which discharges batteries 1 while preventing over-discharge, and FIG. 4 shows a battery pack provided with an over-charge protection circuit 5 which charges batteries 1 while preventing over-charge. A battery pack provided with both the over-discharge protection circuit 4 shown in FIG. 3 and the over-charge protection circuit 5 shown in FIG. 4 can charge and discharge batteries 1 while preventing over-charge and over-discharge. This type of circuit can be used, for example, as a back-up power supply for electronic equipment. In such an application, it charges batteries when remaining battery capacity becomes low, and it supplies power to the electronic equipment via the batteries during periods of commercial power outage.

Although the battery packs shown in FIGS. 3 and 4 are provided with nine batteries 1 and three voltage detection circuits 2, the present invention is not restricted to any particular number of batteries and voltage detection circuits. There can also be eight batteries or less or ten batteries or more, and there can also be two voltage detection circuits or four voltage detection circuits or more.

The battery packs of FIGS. 3 and 4 have a plurality of voltage detection circuits 2 connected in series. All the batteries 1 of the battery packs in FIGS. 3 and 4 are divided into three groups, which are a first, second, and third group. Three voltage detection circuits 2, which are the first, second, and third voltage detection circuits 2, are provided to detect the battery voltage of the three groups. The first voltage detection circuit 2A detects the voltage of the three batteries of the first group, the second voltage detection circuit 2B detects the voltage of the three batteries of the second group, and the third voltage detection circuit 2C detects the voltage of the three batteries of the third group.

The first through third voltage detection circuits 2 are supplied with power supply voltage for circuit operation from batteries 1 divided into the first through third groups. Specifically, the first voltage detection circuit 2A is supplied with power supply voltage from the first group of batteries 1, the second voltage detection circuit 2B is supplied with power supply voltage from the second group of batteries 1, and the third voltage detection circuit 2C is supplied with power supply voltage from the third group of batteries 1. In this battery pack, each voltage detection circuit 2 is supplied with power supply voltage from each battery group. Consequently, in a battery pack that increases its output voltage by connecting many batteries 1 in series, the voltage of each battery can be detected with a voltage detection circuit 2 having a low maximum specified voltage. Incidentally, the lowest potential side of the batteries 1 in FIGS. 3 and 4 (the bottom line in the figures) is taken as ground. However, the highest potential side of the batteries 1 (the top line in the figures) can also be taken as ground instead.

A voltage detection circuit 2 compares battery voltage with a set voltage, and depending on whether battery voltage is higher or lower than the set voltage, switches its output HIGH or LOW. The voltage detection circuits 2A, 2B, 2C of FIG. 3 serve to prevent over-discharge of discharging batteries 1. The set voltage for these voltage detection circuits 2 is the minimum battery voltage, which is the voltage of a completely discharged battery. When the voltage of all detected batteries 1 is greater than the set voltage, which is the minimum voltage, a voltage detection circuit 2 issues a HIGH output signal (in FIG. 3, HIGH indicates normal conditions where discharging or charging is allowed). When the voltage of any battery 1 drops below the set voltage, which is the minimum voltage, a voltage detection circuit 2 switches its output from HIGH to LOW. Specifically, if the voltage of any battery 1 drops to the minimum voltage during discharge and that battery 1 can become over-discharged with further discharging, the associated voltage detection circuit 2 switches its output from HIGH to LOW. When the output of a voltage detection circuit 2 is LOW, the output of a voltage detection circuit 2 is in a high impedance state, current does not flow, and no voltage is developed thereby making the output LOW. When voltage detection circuit 2A, 2B, 2C output is HIGH, current and power consumption from the associated battery group is higher than when output is LOW. When the output of a voltage detection circuit 2 in FIG. 3 is LOW, current and power consumption from the associated battery group can be conserved.

The voltage detection circuits 2 of FIG. 4 also switch their outputs HIGH or LOW depending on whether battery voltage is higher or lower than a set voltage. These voltage detection circuits 2 serve to prevent over-charging for a battery pack being charged. The set voltage for the voltage detection circuits 2 in FIG. 4 is the maximum battery voltage, which is the voltage of a fully charged battery 1. When the voltage of all detected batteries 1 is less than the set voltage, which is the maximum full charge voltage, a voltage detection circuit 2 issues a LOW output signal (in FIG. 4, LOW indicates normal conditions where charging or discharging is allowed). When the voltage of any battery 1 becomes greater than the set voltage, which is the maximum voltage, a voltage detection circuit 2 switches its output from LOW to HIGH. Specifically, if the voltage of any battery 1 rises to the maximum voltage during charging and that battery 1 can become over-charged with further charging, the associated voltage detection circuit 2 switches its output from LOW to HIGH. When the output of a voltage detection circuit 2 is LOW, the output of a voltage detection circuit 2 is in a high impedance state, current does not flow, and no voltage is developed thereby making the output LOW. When the output of voltage detection circuit 2A, 2B, 2C is HIGH, current and power consumption from the associated battery group is higher than when output is LOW.

Output resistors 6 are connected to output terminals 2a of voltage detection circuit 2, and output terminals 2a are connected to battery pack ground via those output resistors 6. When output terminal voltage of voltage detection circuit 2 is in the HIGH state, batteries 1 connected to that voltage detection circuit 2 are discharged through an output resistor 6. In the figures, when output of the first voltage detection circuit 2A is in the HIGH state, batteries 1 of the first group are discharged. When output of the second voltage detection circuit 2B is in the HIGH state, batteries 1 of the first and second groups are discharged. Further, when output of the third voltage detection circuit 2C is in the HIGH state, batteries 1 of the first, second, and third groups, that is all the batteries 1, are discharged. Since the third voltage detection circuit 2C discharges all the batteries 1, batteries are discharged in a balanced fashion. Output resistors 6 of the first and second voltage detection circuits 2A, 2B do not discharge all batteries 1 in a balanced fashion, and result in unbalanced battery 1 discharge.

Discharge circuits 7, which are series connections of balance resistors 8 and switching devices 9, are connected in parallel with batteries that remain un-discharged by voltage detection circuit output resistors 6, which discharge only some of the series connected batteries 1. In the figures, since batteries 1 of the first group are discharged by the first voltage detection circuit 2A, "un-discharged" batteries 1 for the first voltage detection circuit 2A are those batteries 1 of the second and third groups. Therefore, to balance battery discharge by the first voltage detection circuit 2A, a first discharge circuit 7A is connected in parallel with the "un-discharged" batteries 1 of the second and third groups. In addition, since batteries 1 of the first and second groups are discharged by the second voltage detection circuit 2B, "un-discharged" batteries 1 for the second voltage detection circuit 2B are those batteries 1 of the third group. Therefore, to balance battery 1 discharge by the second voltage detection circuit 2B, a second discharge circuit 7B is connected in parallel with the "un-discharged" batteries 1 of the third group. Since the output resistor 6 of the third voltage detection circuit 2C discharges all the batteries 1, a discharge circuit to balance battery discharge by the third voltage detection circuit 2C is not necessary. Consequently, the battery pack of the figures is provided with a first discharge circuit 7A and a second discharge circuit 7B. The first discharge circuit 7A is connected in parallel with batteries 1 of the second and third groups, and the second discharge circuit 7B is connected in parallel with batteries 1 of the third group.

The discharge circuit 7 is a circuit provided to balance the unbalanced discharge of batteries 1 through the output resistors 6 of the voltage detection circuit 2. For a plurality of voltage detection circuits 2, there is one voltage detection circuit 2 that discharges all batteries 1 in a balanced fashion. Consequently, unbalanced discharge of battery pack batteries 1 by each voltage detection circuit 2 can be averted by providing one discharge circuit 7 less than the number of voltage detection circuits 2.

A discharge circuit 7 is provided with a balance resistor 8 and switching device 9 connected in series. The electrical resistance of the balance resistor 8 is set to discharge the same current from the batteries 1 as the voltage detection circuit output resistor 6 draws. A discharge circuit 7 does not always discharge current from the batteries 1. When the switching device 9 is turned on, the discharge circuit 7 discharges specific batteries 1. When the switching device 9 is switched off, the discharge circuit 7 does not discharge any batteries 1. When the output voltage of a voltage detection circuit 2 is HIGH and the output resistor 6 of that voltage detection circuit 2 discharges some of the batteries 1 (while some are left un-discharged), the switching device 9 of the discharge circuit 7 in parallel with the "un-discharged" batteries 1 is turned on to draw current from those "un-discharged" batteries 1 through the balance resistor 8.

When the output of a voltage detection circuit 2 is LOW, batteries 1 associated with that voltage detection circuit 2 are not discharged. Therefore, the switching device 9 of the discharge circuit 7, which is connected in parallel with the batteries 1 not associated with that voltage detection circuit 2 (batteries 1 that remain un-discharged by the output resistor 6 of that voltage detection circuit 2 even in the HIGH state), is turned off. The balance resistor 8 does not discharge any batteries 1 with the switching device 9 off, and since no batteries 1 are discharged, the discharge current of all batteries 1 is balanced.

The discharge circuits 7 are connected to the output sides of the voltage detection circuits 2 via input circuits 10. The first discharge circuit 7A connects to the output side of the first voltage detection circuit 2A via the first input circuit 10A. The second discharge circuit 7B connects to the output side of the second voltage detection circuit 2B via the second input circuit 10B. An input circuit 10 is provided with an input field effect transistor (FET) 11, and the drain of that FET 11 is connected via an input resistor 12 to the gate of another FET, which is the switching device 9. When the output of a voltage detection circuit 2 becomes HIGH, the connected input FET 11 is switched on. The input FET 11, which is switched on, in turn switches on the connected switching device 9, and the balance resistor 8 discharges the associated batteries 1.

In the battery pack described above, when the output of the first voltage detection circuit 2A becomes HIGH and batteries 1 of the first group are discharged, the first discharge circuit 7A discharges those "un-discharged" batteries 1 of the second and third groups. This is because the HIGH output from the first voltage detection circuit 2A switches on the input FET 11 of the first input circuit 10A, and that input FET 11 in turn switches on the switching device 9 of the first discharge circuit 7A. Under these conditions, the first voltage detection circuit 2A discharges batteries 1 of the first group, and the first discharge circuit 7A discharges batteries 1 of the second and third groups. The balance resistor 8 of the first discharge circuit 7A discharges batteries 1 (of the second and third groups) with a current equivalent to the current that discharges batteries 1 (of the first group) through the output resistor 6 of the first voltage detection circuit 2A. As a result, when the first voltage detection circuit 2A discharges batteries 1, the balance resistor 8 of the first discharge circuit 7A discharges the "un-discharged" batteries 1 with the same current, and all batteries 1 are discharged in a balanced fashion.

Correspondingly, when the output of the second voltage detection circuit 2B becomes HIGH and batteries 1 of the first and second groups are discharged, the second discharge circuit 7B discharges those "un-discharged" batteries 1 of the third group. This is because the HIGH output from the second voltage detection circuit 2B switches on the input FET 11 of the second input circuit 10B, and that input FET 11 in turn switches on the switching device 9 of the second discharge circuit 7B. The balance resistor 8 of the second discharge circuit 7B discharges batteries 1 (of the third group) with a current equivalent to the current that discharges batteries 1 (of the first and second groups) through the output resistor 6 of the second voltage detection circuit 2B. As a result, when the second voltage detection circuit 2B discharges batteries 1, the balance resistor 8 of the second discharge circuit 7B discharges the "un-discharged" batteries 1 with the same current, and all batteries 1 are discharged in a balanced fashion. When the outputs of both the first and second voltage detection circuits 2A, 2B are HIGH, the discharges described separately above occur at the same time.

To discharge batteries 1 while preventing the over-discharge of any battery 1, the battery pack of FIG. 3 has the following circuit configuration. An AND circuit 13, which is a series connection of three FET switching devices, is connected to the output side of each voltage detection circuit 2. The three FET switching devices of the AND circuit 13 are mutually interconnected, source to drain, for series connection. The gate of each FET is connected to the output of the first, second, and third voltage detection circuits 2. The output of the first voltage detection circuit 2A is connected via a diode 14 to one of the FET gates of the AND circuit 13. The outputs of the second and third voltage detection circuits 2B, 2C pass through diodes 14, are voltage divided by resistors, and input to separate FET gates. When inputs to all the FET gates of the AND circuit 13 are HIGH, AND circuit 13 output is LOW. (In this case, the AND circuit 13 also inverts and can be called a NAND circuit.) The state where all FET inputs are HIGH means battery voltages detected by the first, second, and third voltage detection circuits 2 are higher than the minimum voltage, and all batteries 1 are in a state that allows discharge. Consequently, when AND circuit 13 output is LOW, the output switch 3A for discharging is turned on to allow battery pack discharge. When the voltage of any battery 1 drops below the minimum voltage, a LOW signal is input to one of the AND circuit 13 FETs, and a HIGH signal is output from the AND circuit 13. Consequently, in this state, the output switch 3A for discharging is turned off and discharge is not possible. For the output switch 3A, for example, a discharging control FET can be used.

In the battery pack described above, when HIGH signals are input to the AND circuit 13 from all the voltage detection circuits 2, the AND circuit 13 switches on the output switch 3A for discharging to put the battery pack in a state that allows battery discharge. If the signal input to the AND circuit 13 from any voltage detection circuit 2 drops LOW, the AND circuit 13 switches off the output switch 3A for discharging to cut-off discharge current and put the battery pack in a state that does not allow discharge.

To balance the discharge of all batteries 1 when a voltage detection circuit 2 has a HIGH output, a discharge circuit 7 discharges "un-discharged" batteries, which are not discharged by the output resistor 6 of that voltage detection circuit 2. When the first voltage detection circuit 2A output is HIGH, the switching device 9 of the first discharge circuit 7A is turned on, and when the second voltage detection circuit 2B output is HIGH, the switching device 9 of the second discharge circuit 7B is turned on. Thus, when a voltage detection circuit 2 discharges some of the batteries 1, the "un-discharged" batteries are discharged through a balance resistor 8 to balance the discharge of all batteries 1.

To charge batteries 1 while preventing the over-charging of any battery 1, the battery pack of FIG. 4 has the following circuit configuration. An OR circuit 15, which is a parallel connection of three FET switching devices, is connected to the output side of each voltage detection circuit 2. The three FET switching devices of the OR circuit 15 have all their drains tied together and all their sources tied together for parallel connection. The gate of each FET is connected to the output of the first, second, and third voltage detection circuits 2. The output of the first voltage detection circuit 2A is connected via a diode 14 to one of the FET gates of the OR circuit 15. The outputs of the second and third voltage detection circuits 2B, 2C pass through diodes 14, are voltage divided by resistors, and input to separate FET gates. When inputs to all the FET gates of the OR circuit 15 are LOW, OR circuit 15 output is HIGH. This is because a FET with a low input is off. (In this case, the OR circuit 15 also inverts and can be called a NOR circuit.) The state where all FET inputs are LOW means battery voltages detected by the first, second, and third voltage detection circuits 2 are lower than the maximum voltage, and all batteries 1 are in a state that allows charging. Consequently, when OR circuit output is HIGH, the output switch 3B for charging is turned on to allow battery pack charging. When the voltage of any battery 1 becomes greater than the maximum voltage, a HIGH signal is input to one of the FETs of OR circuit 15, and a LOW signal is output from the OR circuit 15. Consequently, in this state, the output switch 3B for charging is turned off and charging is not possible. For the output switch 3B, for example, a charging control FET can be used.

In the battery pack described above, when LOW signals are input to the OR circuit 15 from all the voltage detection circuits 2, the OR circuit 15 switches on the output switch 3B for charging, which is a charging control FET $3b$, to put the battery pack in a state that allows battery charging. If the signal input to the OR circuit 15 from any voltage detection circuit 2 becomes HIGH, the OR circuit 15 switches off the charging control FET $3b$ of output switch 3B to cut-off charging current and put the battery pack in a state that does not allow charging.

In this battery pack, when the output of all the voltage detection circuits 2 is LOW, no batteries 1 are discharged by the discharge circuits 7. Except for the third voltage detection circuit 2C, when the output of any voltage detection circuit 2 is HIGH, the battery pack is put in a state of balanced discharge via the discharge circuits 7. When the first voltage detection circuit 2A output is HIGH, the switching device 9 of the first discharge circuit 7A is turned on, and when the output of the second voltage detection circuit 2B is HIGH, the switching device 9 of the second discharge circuit 7B is turned on. Thus, when a voltage detection circuit 2 discharges some of the batteries 1, the "un-discharged" batteries are discharged through a balance resistor 8 to balance the discharge of all batteries 1.

When the output of the first voltage detection circuit 2A is LOW, the switching device 9 of the first discharge circuit 7A is turned off and batteries 1 are not discharged through the balance resistor 8. Similarly, when the output of the second voltage detection circuit 2B is LOW, the switching device 9 of the second discharge circuit 7B is turned off and batteries 1 are not discharged through the balance resistor 8. This is because batteries 1 are not discharged through the output resistor 6 of voltage detection circuit 2 when the output of voltage detection circuit 2 is LOW.

The output switch 3A for discharging and the output switch 3B for charging are connected in series at the output side of the battery pack. If any battery 1 is discharged to the point of becoming over-discharged, the output switch 3A for discharging is switched from on to off to cut-off discharge current. If any battery 1 is charged to full charge, the output switch 3B for charging is switched from on to off to cut-off charging current. Battery over-charging and over-discharging can be prevented when the output switch 3A for discharging and the output switch 3B for charging operate properly. However, if the output switch 3A for discharging or the output switch 3B for charging malfunction and become unable to cut-off current, batteries 1 can become over-charged or over-discharged.

Figure 5:
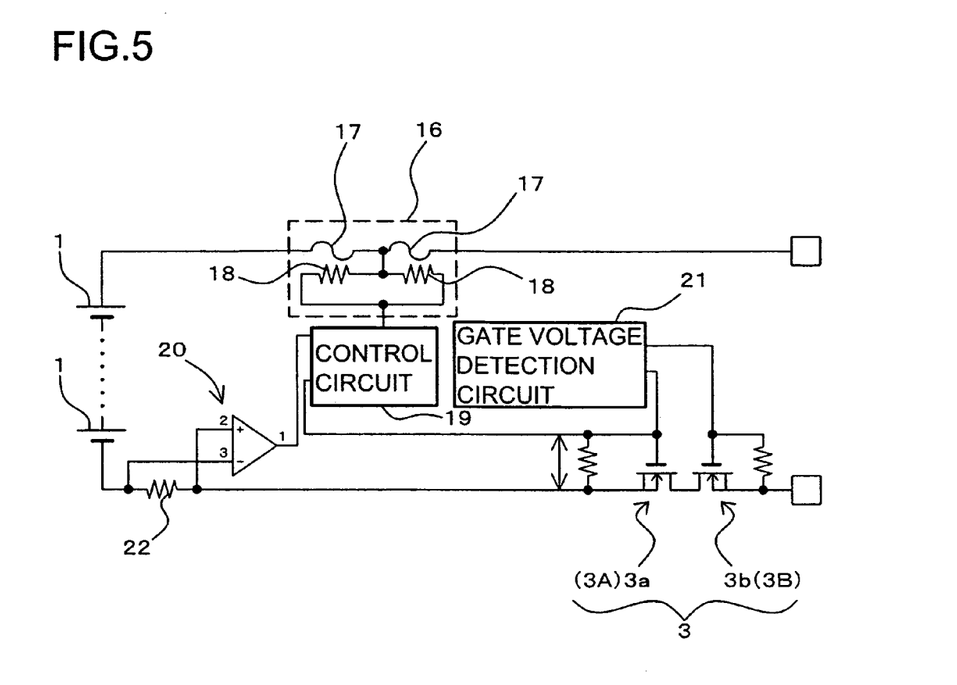
FIG. 5 is a circuit diagram showing one example of a battery pack provided with a protection device.
Figure 6:
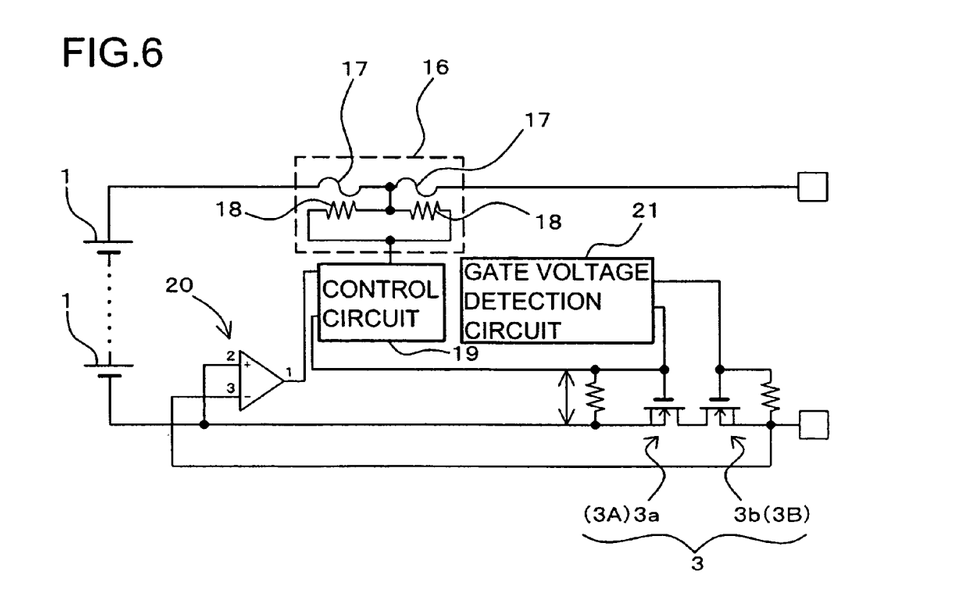
FIG. 6 is a circuit diagram showing another example of a battery pack provided with a protection device.

The battery packs of FIGS. 5 and 6 are provided with circuits to detect failure of the output switch 3A for discharging or the output switch 3B for charging. If the output switch 3A for discharging or the output switch 3B for charging malfunction and become unable to cut-off current, the protection device 16 will cut-off current. The protection device 16 is provided with fuses 17 that fuse open with heat, and heating resistors 18 to heat and fuse open the fuses 17. Current flow through the heating resistors 18 is controlled by a control circuit 19. The control circuit 19 fuses open the fuses 17 when the output switch 3A for discharging or the output switch 3B for charging fail and high currents flow. In the figures, the output switch 3A for discharging is a discharging control FET 3a, and the output switch 3B for charging is a charging control FET 3b.

The control circuit 19 controls current flow through the heating resistors based on a signal input from a current detection circuit 20 and a signal input from a gate voltage detection circuit 21, which detects the gate-to-source voltage of the discharging control FET 3a and the charging control FET 3b. In the battery pack of FIG. 5, current flowing through the battery pack is detected by the voltage developed across the terminals of a current detection resistor 22. In the battery pack of FIG. 6, current flowing through the battery pack is detected by the voltage drop across the discharging control FET 3a and the charging control FET 3b. Current flowing through the battery pack is the drain current of the discharging control FET 3a and the charging control FET 3b, which are output FETs.

The control circuit 19 judges output FET failure to fuse open the fuses 17 based on output FET current and gate voltage. When output FET drain current is flowing and gate voltage is above the threshold voltage, the control circuit 19 judges the output FET to be good. In addition, when output FET drain current does not flow and gate voltage is approximately zero, the control circuit 19 also judges the output FET to be good. However, when drain current is flowing even though gate voltage is approximately zero, the control circuit 19 judges the output FET to be failing and provides current to the heating resistors 18 to fuse open the fuses 17. In addition, when gate voltage is above the threshold voltage and drain current does not flow, the control circuit 19 also judges the output FET to be failing and fuses open the fuses 17.

Since the discharging control FET 3a and the charging control FET 3b are connected in series in the battery pack of the figures, the control circuit 19 detects the gate voltage of the discharging control FET 3a, the gate voltage of the charging control FET 3b, and the drain current of both FETs to judge whether either FET is failing. If either FET is failing, the control circuit 19 provides current to the heating resistors 18 to fuse open the fuses 17 and put the battery pack in a state that makes charging and discharging impossible.

Figure 7:
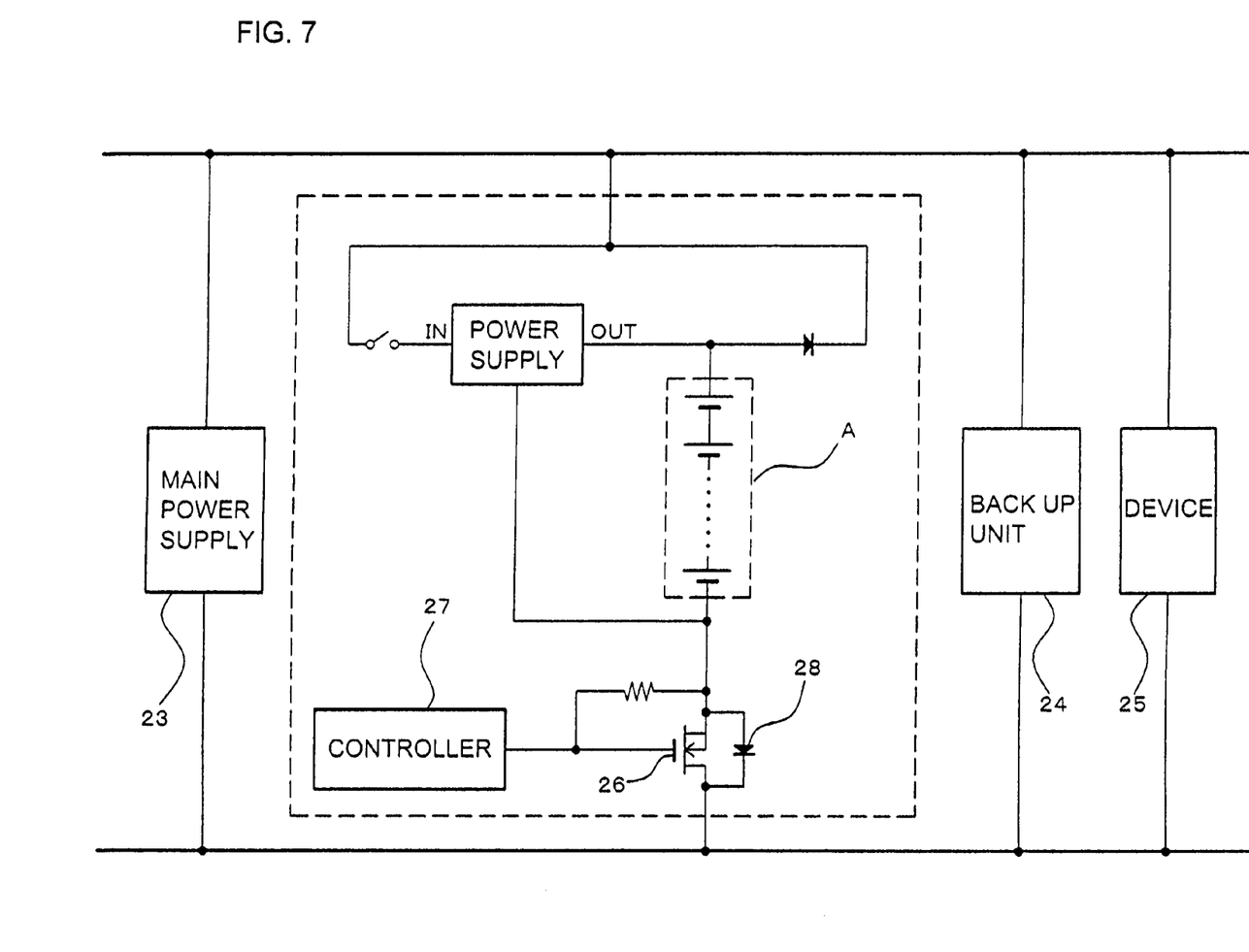
FIG. 7 is a block diagram showing one example of an embodiment of the battery pack of the present invention used as an uninterruptible power supply.

The battery pack of the present invention can be used as an uninterruptible power supply as shown in FIG. 7. If power outage occurs and power is no longer supplied from the main power supply 23, power is supplied to the load, which is a backup unit 24 and some device 25, from the battery pack A of the uninterruptible power supply. The battery packs shown in FIGS. 3 and 4 can be used for this type of battery pack A. The uninterruptible power supply has an N-channel FET 26 connected to its low-side, which is between the battery pack and ground. With the N-channel FET 26 on, power is supplied to the load from the battery pack. With the N-channel FET 26 off, discharge current is cut-off and power is not supplied to the load from the battery pack. The N-channel FET 26 is controlled on and off by a controller 27. When the battery pack becomes completely discharged, the controller 27 turns the N-channel FET off to suspend discharging. Since the N-channel FET 26 has a parasitic diode 28, the batteries can be charged with the N-channel FET 26 either on or off. However, if batteries are charged with the N-channel FET 26 in the off state, charging current flows via the parasitic diode 28 and FET heating will increase. This drawback can be corrected by externally connecting a diode, which has a low forward bias voltage drop, with the same polarity as the parasitic diode 28. The uninterruptible power supply described above can be manufactured inexpensively. This is because connection of a low-side N-channel FET 26 can make circuit structure simple.

Figure 8:
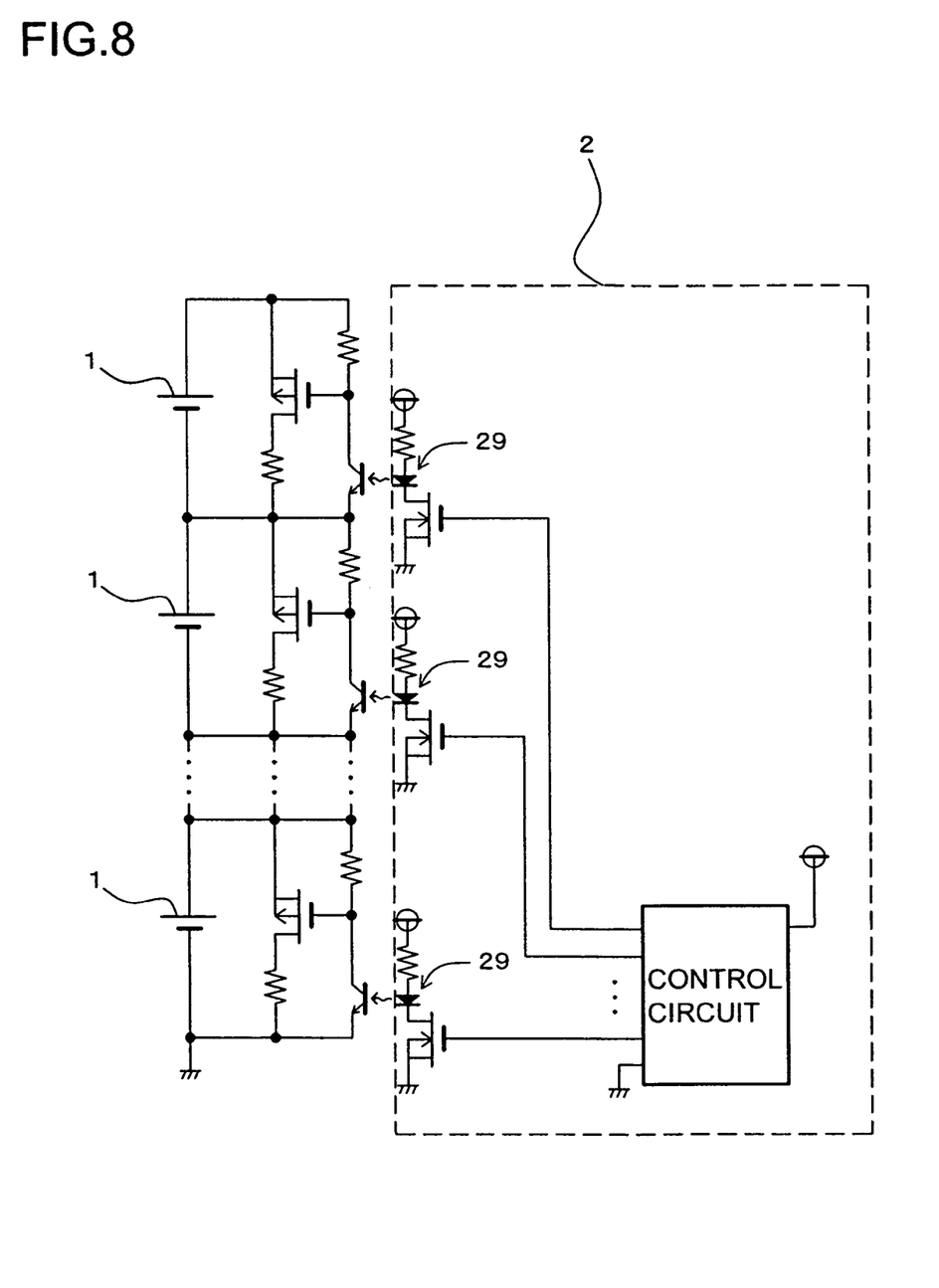
FIG. 8 is a circuit diagram showing an example for reference of a battery pack that eliminates unbalanced discharge.

The battery pack of the present invention is provided with discharge circuits 7 to eliminate unbalanced battery discharge by voltage detection circuits 2. FIG. 8 shows a battery pack that eliminates the unbalanced battery 1 discharge by voltage detection circuits 2 without providing discharge circuits. However, this battery pack is not associated with the embodiments of the present invention and is an example shown for reference. In this battery pack, optically coupled isolation devices 29 such as photo-couplers or photo-MOS-relays are connected to the outputs of the voltage detection circuits 2 to transmit voltage detection circuit output signals. Since the optically coupled isolation devices 29 are not connected to ground and can transmit signals while isolated from ground, unbalanced battery discharge can be avoided.

As this invention may be embodied in several forms without departing from the spirit and essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on Application No. 2004-328962 filed in Japan on Nov. 12, 2004, the content of which is incorporated hereinto by reference.

What is claimed is:

1. A battery pack comprising:
a plurality of series connected batteries;
a plurality of voltage detection circuits for detecting battery voltage of each of the batteries, each of the voltage detection circuits having an output terminal connected to battery pack ground via an output resistor;
a plurality of output switches that are controlled on and off by an output terminal voltage of each of the voltage detection circuits,
wherein the plurality of voltage detection circuits are connected in series and their outputs are switched HIGH or LOW depending on the detected battery voltage, and when output terminal voltage of one of the voltage detection circuits is HIGH, the batteries connected to the one voltage detection circuit discharge through the associated output resistor; and
at least one discharge circuit comprising a series connection of a balance resistor and a switching device, the discharge circuit being connected in parallel with the batteries of the plurality of batteries that remain undischarged by the output resistors of the voltage detection circuits,
wherein, when output terminal voltage of one of the voltage detection circuits is HIGH and the batteries that are connected to the one voltage detection circuit are discharged, the switching device of the discharge circuit connected in parallel with the un-discharged batteries for that voltage detection circuit is turned on to discharge the un-discharged batteries via the balance resistor, and
wherein, when output terminal voltage of one of the voltage detection circuits is LOW, the batteries that are connected to the one voltage detection circuit are not discharged, and the switching device of the discharge circuit is turned off leaving the un-discharged batteries un-discharged to balance discharge currents of all of the batteries.

2. A battery pack as recited in claim 1, wherein the electrical resistance of the balance resistor is set at a value to discharge current from the batteries that is the same as current drawn by the output resistors of the voltage detection circuits.

3. A battery pack as recited in claim 1, wherein the discharge circuit is connected to the output side of one of the voltage detection circuits via an input circuit.

4. A battery pack as recited in claim 3, wherein the input circuit is provided with an input FET, a drain of the input FET is connected to the switching device, and the switching device of the discharge circuit is switched on and off by the one voltage detection circuit.

5. A battery pack as recited in claim 1, wherein voltage detection circuit output is HIGH if the detected voltage of all of the batteries is a voltage that allows discharge, and voltage detection circuit output is LOW if detected battery voltage is below the voltage that allows discharge.

6. A battery pack as recited in claim 5, wherein a minimum voltage that allows discharge is set at a voltage of a completely discharged battery.

7. A battery pack as recited in claim 5, further comprising an AND circuit connected to an output side of each of the voltage detection circuits, wherein one of the output switches is controlled by an output of the AND circuit,
wherein, when voltage detected by all of the voltage detection circuits is a voltage that allows discharge, the AND circuit output controls the one output switch on.

8. A battery pack as recited in claim 5, further comprising:
an AND circuit comprising a series connection of switching devices, the AND circuit being connected to an output side of each of the voltage detection circuits, wherein:
when the voltages of all of the batteries detected by the voltage detection circuits are voltages that allow discharge, a HIGH signal is output to the AND circuit, and if the voltage of any of the batteries is lower than the voltage that allows discharge, a LOW signal is output to the AND circuit;
when HIGH signals are input to the AND circuit from all of the voltage detection circuits, one of the output switch is turned on to allow battery pack discharge, if the signal from any voltage detection circuit is LOW, the output switch is turned off to cut-off discharge current;
the switching device of the discharge circuit is switched on and off by voltage detection circuit output, when output from one of the voltage detection circuits is HIGH, the switching device is turned on, the one voltage detection circuit discharges some of the batteries connected to the one voltage detection circuit, and the balance resistor discharges the un-discharged batteries.

9. A battery pack as recited in claim 1, wherein an output of one of the voltage detection circuits is LOW if the voltage of all of the batteries detected is a voltage that allows charging, and an output of the one voltage detection circuit is HIGH if detected battery voltage is above the voltage that allows charging.

10. A battery pack as recited in claim 9, wherein a maximum voltage that allows charging is set at a voltage of a fully charged battery.

11. A battery pack as recited in claim 9, further comprising an OR circuit connected to an output side of each of the voltage detection circuits, wherein one of the output switches is controlled by an output of the OR circuit, and when voltage detected by all of the voltage detection circuits is a voltage that allows charging, an output of the OR circuit controls the output switch on.

12. A battery pack as recited in claim 9, further comprising an OR circuit comprising a parallel connection of switching devices, the OR circuit being connected to an output side of each of the voltage detection circuits, wherein:
when the voltages of all of the batteries detected by one of the voltage detection circuits are voltages that allow charging, a LOW value is output to the OR circuit, and, if the voltage of any of the batteries is higher than the voltage that allows charging, a HIGH value is output to the OR circuit;
when LOW signals are input to the OR circuit from all of the voltage detection circuits, the output switch is turned on to allow battery pack charging, and if a signal from any of the voltage detection circuits is HIGH, the output switch is turned off to cut-off charging current;
the switching device of the discharge circuit is switched on and off by voltage detection circuit output, when the output of the voltage detection circuit is HIGH, the switching device is turned on, the voltage detection circuit discharges some of the batteries, and the balance resistor discharges the un-discharged batteries.

13. A battery pack as recited in claim 1, wherein the battery pack is used as an uninterruptible power supply, when a power outage occurs and power is no longer supplied, power is supplied to a load from the battery pack.

14. A battery pack as recited in claim 13, wherein the uninterruptible power supply battery pack has an N-channel FET connected between the battery pack and ground, when the N-channel FET is on, power is supplied to the load from the battery pack, and when it is off, discharge current is cut-off and no power is supplied to the load.

* * * * *